United States Patent [19]
Crookham et al.

[11] 3,774,880
[45] Nov. 27, 1973

[54] BUTTERFLY VALVE BODY

[75] Inventors: Carter C. Crookham; Robert C. Billings, both of Oskaloosa, Iowa

[73] Assignee: Clow Corporation, Oak Brook, Ill.

[22] Filed: Feb. 11, 1972

[21] Appl. No.: 225,530

[52] U.S. Cl. ................................ 251/307, 285/350
[51] Int. Cl. .................................................. F16r 1/228
[58] Field of Search ........................ 277/187, 188; 251/306, 307; 285/350, 421

[56] References Cited
UNITED STATES PATENTS

| | | | |
|---|---|---|---|
| 3,630,485 | 12/1971 | Williams | 251/307 |
| 3,197,174 | 7/1965 | Killian | 251/307 |
| 3,393,697 | 7/1968 | Fawkes | 251/307 X |
| 3,412,975 | 11/1968 | Kurkjian | 251/307 X |

*Primary Examiner*—Henry T. Klinksiek
*Attorney*—William E. Anderson et al.

[57] ABSTRACT

A butterfly valve body comprising an annular gasket defining a valve disc seat which is disposed in an annular groove. The gasket is formed of a resilient material and is proportioned to provide an annular space in the groove. The butterfly valve body further includes an annular retaining ring disposed within the annular space, the ring being split. The ring may be displaced at the split for insertion into the annular space. Means are provided for precluding axial movement of the ring in a direction away from the gasket so as to prevent rocking of portions of the ring.

20 Claims, 9 Drawing Figures

3,774,880
Fig.1
Fig.3
Fig.2
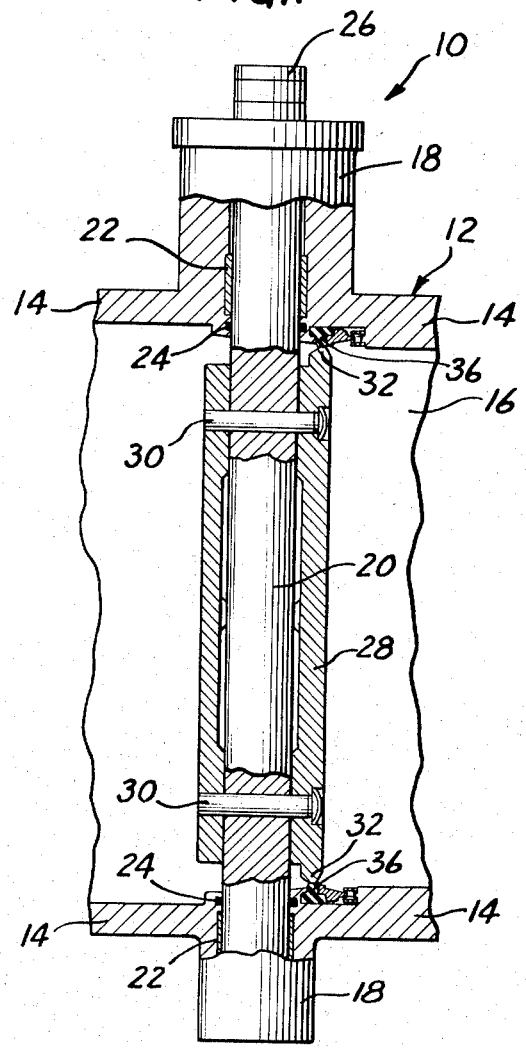
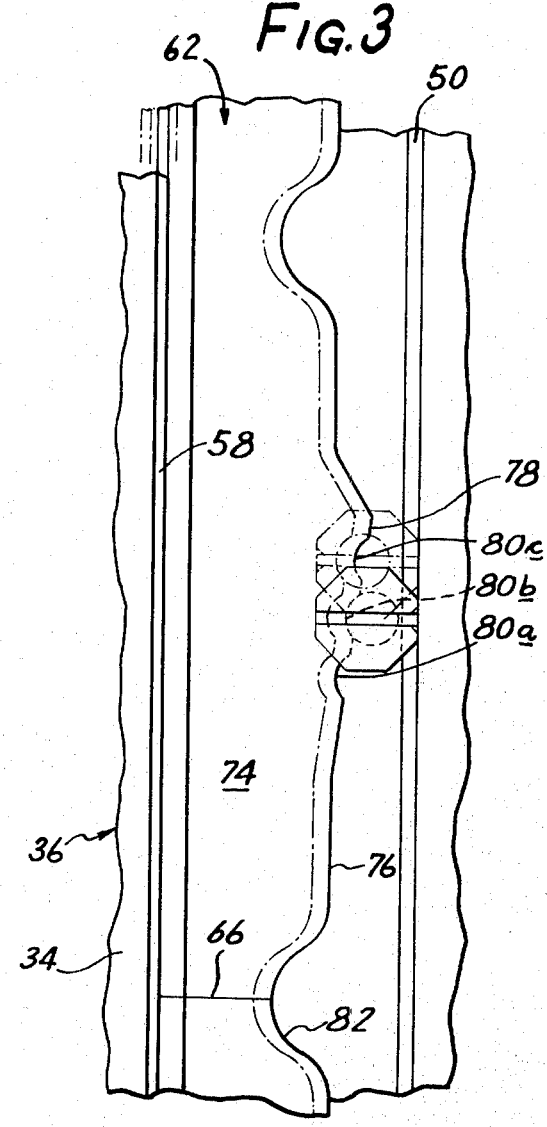
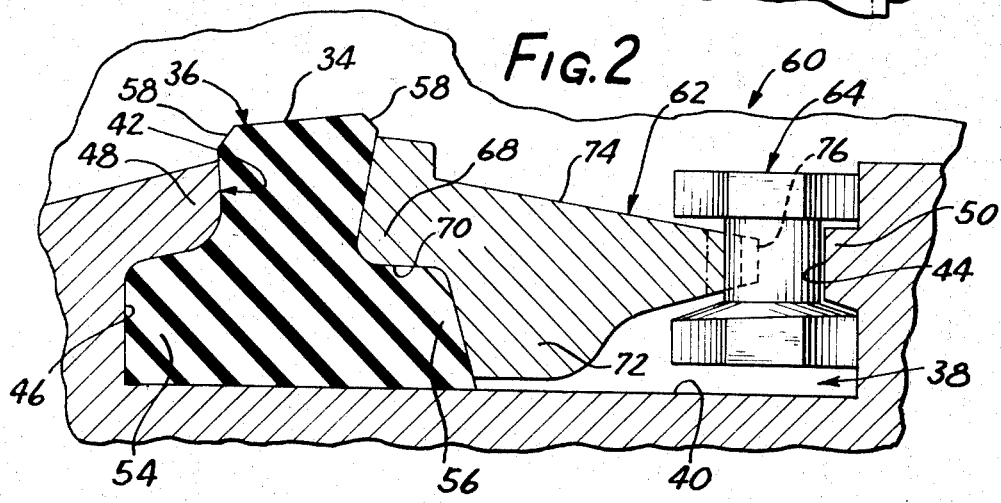

BUTTERFLY VALVE BODY

The present invention relates to butterfly valves and, more particularly, to butterfly valves which include a resilient gasket defining a valve seat adapted to cooperate with the periphery of a valve disc to provide a seal.

Butterfly valves conventionally include a valve body defining a fluid flow passageway, and a circular or generally circular valve disc mounted within the passageway for pivotal movement between an open position parallel to the longitudinal axis of the flow passageway and a closed position perpendicular to the longitudinal axis of the flow passageway. When in the closed position, a peripheral portion of the disc engages a seat defined within the valve body to provide a fluid-tight seal. One of the interchanging sealing surfaces of the disc and seat is preferably defined by a resilient material forming a gasket to assure a tight fit between these surfaces. In addition, the position of one of the surfaces is desirably rendered adjustable to eliminate the necessity of precise machining when the valve is fabricated and to permit compensation for wear and other factors adverse to a fluid-tight seal after the valve has been placed in service.

One approach for achieving the desired surface adjustment is to provide means for compressing the resilient material or gasket which defines one of the interengaging sealing surfaces so as to expand the material and thereby shift the position of the sealing surface. More specifically, a common approach has been to provide an annular gasket of rubber or elastomeric material disposed in a groove in the valve body, the inner periphery of the gasket defining a seat for engagement by the outer periphery of a valve disc. Means are then provided for applying axially directed force to the annular gasket to expand it radially as necessary to achieve the desired sealing relationship.

In the past, the annular gasket has been positioned within a groove of the valve body with one of its circular or end faces abutting one wall of the groove and with the other of its end faces engaged by a series of metal segments arranged within the groove to form a segmented ring. Means were provided for urging the segments into pressure engagement with the gasket. This approach has not been completely satisfactory since the segments tend to tip or roll away from the gasket so as to reduce their effectiveness. Solid rings in place of the segments have been proposed, but such rings require a sepcialized machining of the valve body to permit their insertion behind the gasket.

Accordingly, it is the principal object of the present invention to provide an improved butterfly valve of the type which includes a valve disc seat defined by a resilient material and means for placing the resilient material in compression so as to shift the position of the valve seat.

Other objects and advantages of the invention will become apparent with reference to the following description and the accompanying drawings.

In the drawings:

FIG. 1 is a fragmentary elevational view, partially in section, of a butterfly valve showing various of the features of the invention;

FIG. 2 is an enlarged fragmentary sectional elevational view of a portion of the butterfly valve shown in FIG. 1;

FIG. 3 is an enlarged fragmentary plan view of that portion of the butterfly valve of FIG. 1 which is shown in FIG. 2;

Figure 4:
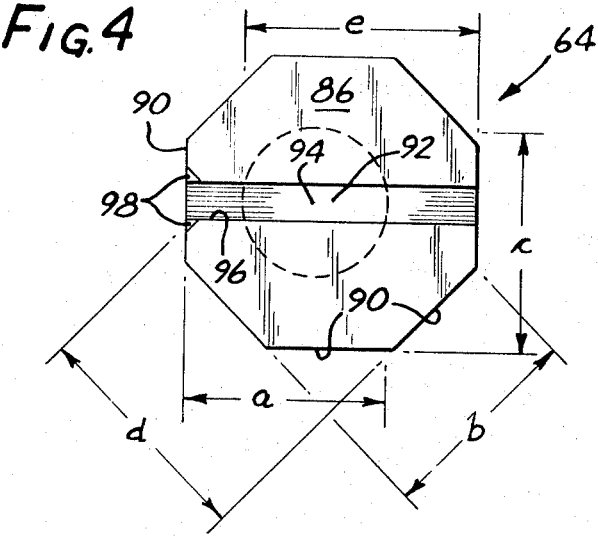
FIGS. 4 and 5 are enlarged plan and elevational views, respectively, of one element forming a portion of the butterfly valve shown in FIGS. 1 through 3.

Referring more specifically to the drawings, there is illustrated in FIG. 1 a butterfly valve 10 which incorporates various of the features of the invention. The valve 10 includes a valve body 12, only a portion of which is illustrated. Basically, the valve body includes a generally cylindrical wall 14 defining a fluid flow passageway 16, the longitudinal axis of this passageway being hereinafter referred to as the flow axis of the passageway. Although not shown in the drawing, it is contemplated that an annular flange or other means be provided at each end of the cylindrical wall 14 to facilitate attachment of the valve body to suitable segments of pipe or conduit.

Projecting from the valve body at diametrically opposed locations are a pair of trunnions 18 which define suitable journals for a valve stem 20. Although all of the internal detals of construction of the trunnions are not shown, each journal is illustrated as being lined with a suitable bearing material indicated at 22, and each may be provided with a sealing element such as an O-ring 24 disposed in a suitable groove, as shown, or in the bearing space. One end 26 of the valve stem 20 projects outwardly of its trunnion 18 for connection to a suitable operating device (not shown) by means of which rotation of the stem is effected.

A valve disc 28 is mounted on the valve stem and, as illustrated, is cylindrical and includes a diametrical bore to receive the vale stem 20. However, the disc may be provided with diametrically opposed flats under some circumstances at the points where the valve stem is joined to the disc. Suitable holes extend through the disc and stem to receive pins 30 by means of which the disc is secured to the stem, but the disc may also be keyed or otherwise held to the stem. The disc includes adjacent one face a radially projecting peripheral flange 32, the edge of which engages a valve seat 34 defined by a gasket 36, soon to be described. The plane within which the edge of the valve disc lies is offset from the axis of rotation of the disc, as defined by the longitudinal axis of the valve stem 20, to make possible 360° contact between the edge and the valve seat 34.

In order to accommodate the gasket 36, the valve body 12 is provided with an inner annular groove 38 in the surface of the cylindrical wall 14 which defines the fluid flow passageway 16. The groove is positioned so as to be intersected by the plane defined by the edge of the valve disc flange 32 when the disc is in the closed position transverse to the fluid flow passageway and includes a base 40 and opposed side walls 42 and 44. The base 40 may define a generally cylindrical surface, and is so illustrated, while the side walls 42 and 44 have a specific configuration (FIG. 2). More specifically, the groove wall 42 nearest the valve stem 20, hereinafter sometimes referred to as the left wall because of its location in the drawing, is formed to provide an undercut 46 relative to which an annular lip 48 is disposed in overhanging relation. The opposite or right wall 44 of the groove 38 lies generally in a plane normal to the flow axis of the valve body and is provided with an annular projection 50, the lower surface of which is spaced from the base 40 of the groove.

The valve seat 34 is defined by the inner surface of the annular gasket 36 which is formed of a resilient elastomeric material such as rubber which will expand under compression if otherwise unrestrained. Various materials known in the art for this particular application are suitable. The gasket 36 may be formed of one piece, as shown, of two or more pieces, which pieces may or may not be connected or bonded to one another at their adjacent ends. It is formed to provide a pair of axially extending annular flanges 54 and 56 adjacent its outer periphery (FIG. 2), and extends radially from these flanges a distance greater than the depth of the groove 38 so that the seat 34 defined by the inner surface of the gasket 36 is disposed inwardly of the inner surface of the valve body walls defining the fluid flow passageway 16. As shown, the gasket is of a lesser axial width than the groove 38, i.e., the axial width of the gasket at its outer surface defined by the flanges 54 and 56 is less than the axial width of the base 40 of the groove. However, the flanges 54 and 56 could extend from the wall 44 to the wall 46 of the groove if desired. The seat 34 itself may define a cylindrical surface but, as shown, is inclined slightly relative to the flow axis and therefore defines a frustoconical surface to enhance the sealing ability of the valve. The leading and trailing edges of the gasket are chamfered adjacent the seat 34, as at 58.

As disposed in the groove 38, the outer surface of the gasket 36 rests on the base 40 of the groove, with the flange 54 of the gasket disposed within the undercut 46 of the groove wall 42, thereby serving to lock the flange 54 within the groove. Preferably, the groove wall 42 and the adjacent face of the gasket 36 are so shaped as to permit intimate engagement between the wall and gasket, and in the illustrated embodiment, the edges of each are rounded to eliminate stress concentrations. Because of the difference between the axial width of the gasket and the axial width of the groove, an annular space is provided between the opposite face of the gasket (i.e., the face on the right in FIGS. 1 and 2) and the wall 44 of the groove.

With the gasket supported on the base 40 of the groove with one face thereof in abutting intimate engagement with the wall 48 of the groove, compressive forces applied to the opposite face of the gasket, particularly those forces having an axial component, will cause radial inward expansion of the gasket effective to vary the position of the valve seat 34. Such compressive forces are applied to the gasket by means which include, in the illustrated embodiment, a retaining ring 62 and a plurality of chocks 64. The retaining ring 62 is disposed within the groove 38 between the gasket 36 and the groove wall 44 with one face thereof in abutting relation to the gasket. The chocks 64 are wedged intermediate the ring 62 and the groove wall 44 and maintain the retaining ring in axially directed pressure engagement with the gasket. The effective width of the chock and, hence, the pressure exerted on the gasket 36, may be varied by varying the disposition of the chocks relative to the ring 62.

Figure 6:
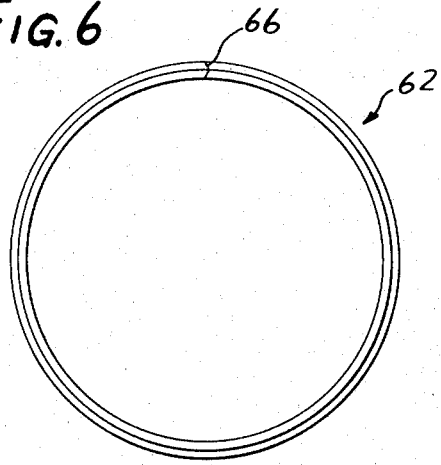
FIG. 6 is an elevational view on a reduced scale of another element forming a portion of the butterfly valve shown in FIGS. 1 through 3.

More specifically, the retaining ring 62 of the illustrated embodiment is circular in shape and is continuous except for a split or cut 66 which is V-shaped in cross section as viewed in a plane normal to the flow axis of the valve body (FIG. 6). The ends of the ring therefore interlock to prevent shifting movement thereof relative to each other in radial directions. The outer diameter of the ring is slightly less than the diameter of the cylindrical surface defining the base 40 of the groove 38 and, as shown in the drawings, is greater than the diameter of the flow passageway of the valve body adjacent the groove (FIG. 2).

Figure 7:
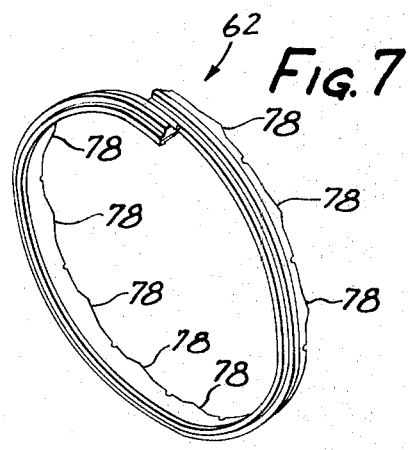
FIG. 7 is a perspective view of the element shown in FIG. 6, but in a partially collapsed condition.

The ring is preferably formed of a metal which is resistant to corrosion from exposure to the fluid being conveyed, and should be resilient or deformable so that the ring can be collapsed for insertion into the groove 38. This can be done, for example, by taking the ends of the ring at the split 66, displacing them out of alignment, and then overlapping the ends by squeezing the ring to reduce its outer diameter (FIG. 7). If the ring is formed of a sufficiently resilient material, it will spring back into its original shape when the forces on it are released. Otherwise, it can be urged back into its original shape manually.

That face of the ring which engages the gasket 36, the left face of the ring in FIG. 2, is shaped to conform intimately to the right face of the gasket over a surface of the gasket extending from adjacent the inner surface or seat 34 of the gasket to closely adjacent the base 40 of the groove. The gasket is thus engaged and contained over essentially its entire lateral surfaces by the side wall 42 of the groove and by the retaining ring 62, and is engaged and contained over its outer cylindrical surface by the bottom wall 40 of the groove. Any axially directed forces exerted on the gasket by the retaining ring will therefore cause the seat 34 to be displaced radially inwardly in the direction of the flow axis of the valve body since this is the only direction in which the gasket is not restrained.

It will be noted from FIG. 2 that the retaining ring 62 is provided with an annular lip 68 which overlies the inner surface of the annular flange 56 of the gasket 36. In a preferred embodiment, the retaining ring is dimensioned so that the outer surface 70 of the lip will exert a radially directed outward force on the flange 56 when the ends of the ring are in abutting relation at the split 66. That is, the outer diameter of the lip 68, as defined by the surface 70, is greater than the inner diameter of the flange 56 in the uncompressed state. In order for the ring to exert a radially directed outward force on the flange 56, it is forced into a circular configuration within the groove 38 against the flange 56 by forcefully expanding it until the ends of the ring abut at the split 66. The V-shaped configuration of the ring ends at the split, plus the resiliency of the ring tending to force the ends into engagement with each other, maintains the ring in the expanded condition. This condition is also maintained by the ring, when in stress, to create the seat. The flange 56 of the gasket and the ring 62 are thus in compression, and the gasket and ring are held securely in place.

Alternatively, the ring 62 may be dimensioned so as not to be in compression after initial installation of the ring and so as not to place the flange 56 in radial compression. Under such conditions, there might conceivably be a slight gap between the ends of the ring at the split 66. However, the fact that the ring is continuous except for the split 66 minimizes any tipping or rocking of any one portion thereof relative to an adjacent portion since all portions are interconnected to each other, the ring being a single piece. More specifically, in order for any one portion of the ring to tip or rock, as about a point along the right end edge of the ring so as to lift the surface 70 of the lip 68 off the flange 56 of the gasket, it would be necessary for a connected portion of the ring to move axially in a direction away from the gasket 36, and such axial movement is precluded by the chocks 64, which are circumferentially spaced around the ring 62, as hereinafter described. The stiffness of the ring also minimizes any tipping or rocking, and accordingly, the ring should have sufficient stiffness so that it does not bend or twist.

The outer surface of the ring 62 is provided with an annular rib 72 while the inner surface 74 is generally flat. Both surfaces converge toward a rearward face or edge 76, the configuration of which can best be seen in FIG. 3. From FIG. 3, it will be noted that the rearward face 76 is spaced from the projection 50 of the groove wall 44 to provide a space for the chocks 64, with the center of the face 76 being generally in alignment with the center of the projection 50.

Referring to FIG. 3, it will be noted that the face 76 is configured to provide shoulder areas 78, each of which is provided with three notches 80 (designated 80a, 80b and 80c in FIG. 3) defining curved bearing surfaces engageable by the chocks 64. As shown in the drawings, the surface of each shoulder area, within which the notches 80 are provided, lies in a plane which is inclined relative to the forward or left-hand face of the lip 68 of the ring so that, although the notches 80 are of identical size and depth relative to the face 76 of the ring, their bearing surfaces are spaced different distances from the face of the lip. Accordingly, a chock of given dimension will space the face 76 of the ring different distances from the projection 50 of the groove depending upon which notch it occupies; and, thus, the compressive force on the gasket, as caused by the axial location of the ring 62, can be varied depending upon which notch is occupied.

It is contemplated that a plurality of shoulder areas 78 be provided on the ring 62 in circumferentially spaced relation to one another (FIG. 7), and that each will cooperate with a chock 64. For example, in a valve having a flow passageway diameter of sixteen inches, twellve such areas may be provided, each spaced 30° circumferentially from an adjacent area.

Adjacent each shoulder area 78, the face 76 of the ring is indented, as at 82, to facilitate insertion of a chock 64 for movement circumferentially along the ring to a notch 80 of a shoulder area 78. Thus, an indentation 82 is provided for each shoulder area 78. In the illustrated embodiment, the slit 66 is provided at one of the indentations 82 (FIG. 3).

The chocks 64 are similar to those shown and described in copending United States application Ser. No. 170,922 filed Aug. 11, 1971, and are adapted to be placed intermediate the ring 62 and the adjacent wall 44 of the groove 38. They are proportioned so that they will bear against both the ring and the groove wall so as to maintain the ring a desired distance from the wall 44 and thereby maintain the ring in a pressure engagement with the gasket 36 so as to effect radial expansion thereof. Thus, the chocks cause the ring to always exert a compressive force on the gasket. The degree of force will vary depending upon which notch 80 each of the chocks occupies. In addition, the chocks are formed eccentrically about their longitudinal axes, which are radially disposed relative to the flow axis of the valve body, so as to permit their effective diameter (thickness) to be varied depending upon their rotative position, thus permitting further adjustment in the compressive forces which they maintain.

Figure 5:
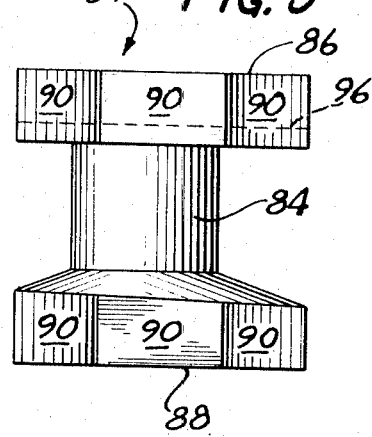

More specifically, a representative chock 64 is illustrated in enlarged form in FIGS. 4 and 5 and includes a generally cylindrical hub 84 provided with an upper head 86 and a lower head 88 each of polygonal transverse cross-sectional configuration. The hub 84 if of circular transverse cross-sectional configuration (FIG. 4), although other configurations are possible, and has a radius closely corresponding to the radius of curvature of the notches 80 so that the hub will conveniently fit into and bear against the bases or bearing surfaces of the notches. In a preferred embodiment, the hub has a diameter of approximately one-fourth inch and the notches have a radius of curvature which is slightly larger than one-eighth inch.

By virtue of their polygonal cross-sectional configuration, the heads 86 and 88 define flats 90 which lie in planes parallel to the cylindrical axis of the hub 84. In the illustrated embodiment, the polygonal configuration is octagonal, although other configurations are possible. Both of the heads 86 and 88 are of like configuration and size so that each flat of each head lies in the same plane as a flat of the opposite head. In the assembled valve, the hub of each chock bears against the bearing surface of a notch 80 while a flat 90 of each head 86 and 88 bears against the groove wall 44 on opposite sides of the projection 50. Thus, the effective width of the chock for purposes of spacing the retaining ring 62 from the wall 44 is the distance between the plane within which lie the flats 90 in engagement with the groove wall 44 and a parallel plane tangent to the diametrically opposite surface of the hub 84.

As best seen in FIG. 4, the geometric centers 92 of the heads 86 and 88 are displaced from the cylindrical axis 94 of the hub 84 along a line perpendicular to an opposed pair of flats 90. Thus, the planes defined by certain pairs of flats 90 are spaced from the diametrically opposite cylindrical surface of the hub 84 a different distance than are other planes. In the illustrated embodiment, these different distances are designated a through e, and it will be noted that there are thus five different spacings available. If the geometric centers of the heads are spaced from the cylindrical axis of the hub along a line not perpendicular to a flat 90 of an octagonal head, and along a line not passing through a corner, i.e., not passing through a line formed at the juncture of two flats 90, there will be seven different spacings. In the illustrated embodiment, the head 86 is provided with a slot 96 in its upper surface transverse to the cylindrical axis 94 of the hub to receive the end of a screwdriver so as to facilitate rotation of the chock. One end of the slot is fanned or notched, as at 98, to indicate that the flat 90 adjacent thereto provides the minimum effective width of the chock when in engagement with the wall 44 of the groove 38.

In the assembly of the embodiment of the butterfly valve 10 illustrated in FIGS. 1–7, assuming all initial machining has been accomplished, the gasket 36 is inserted into the groove 38 in abutting relation to the wall 42 of the groove with the flange 54 of the gasket in the undercut 46. The retaining ring 62 is then collapsed radially as, for example, as shown in FIG. 7 to reduce its diameter, placed within the groove 38 adjacent the gasket, and restored to its original shape. The ring 62 may be merely collapsed radially to reduce its diameter. Depending upon the dimensional relationship between the gasket and the ring 62, the flange 56 of the gasket may be in radial compression, but an annular space will exist intermediate the ring 62 and the opposite wall 44 of the groove. At this point, therefore, the gasket 36 will not be in axial compression. A suitable tool, such as a screwdriver, may then be inserted between the groove wall 44 and the ring adjacent to the indentations 82 to wedge the ring toward the gasket, thereby enlarging the gap between the ring and the wall 44 and placing the gasket temporarily in compression.

Chocks 64 are then inserted between the ring and the adjacent groove wall 44 at each indentation 82 and then successively moved or wedged circumferentially until the hub 84 of each resides in and bears against the base surface of that notch 80a which is closest to the gasket 36, with a portion of each of the heads 86 and 88 disposed on opposite sides of the end face 76 of the ring, and with a flat 90 of each head bearing against the wall 44 above and below the projection 50. The rearward or right-hand face 76 of the ring and the projection 50 thus maintain each chock against movement longitudinally of its axis.

When the chocks are positioned with the hubs 84 resting in and partially confined by the semicircular notches, they can be rotated about the cylindrical axes of the hubs by means of a screwdriver or similar tool inserted into the slots 96, these axes being stationary relative to the ring 62. Such rotation will bring different flats 90 of the chocks to bear against the groove wall 44 and thus further vary the compressive force which the chocks are capable of maintaining against the segments.

The proper or desirable degree of compression of the gasket is determined empirically by connecting the valve inlet to a source of fluid under pressure with the valve disc 28 in the closed position and then checking the outlet side of the valve disc for leakage. This may be done by closing the valve, disposing the valve body with the flow axis vertically oriented and with the valve disc 28 horizontally disposed, partially filling the valve body above the disc 28 with water, and connecting the valve body below the disc to a source of air under pressure. Bubbles passing upwardly through the water will indicate the presence of a leak.

When placing the chocks 64 in the space between the segments and groove wall 44, it is preferable to first place a chock in each of the notches 80a nearest the gasket 36 (the lowermost notch in FIG. 3) and with the flat 90 the minimum distance $a$ from the surface of the hub in contact with the wall 44, i.e., with the flat 90 adjacent the fanned end 98 of the slot 96 in engagement with the groove wall. If such an arrangement produces leakage at certain portions of the periphery of the valve disc, the chocks adjacent such portions are rotated to successively bring the flats which are a distance $b$, $c$, $d$, and $e$ from the opposed surface of the hub into contact with the wall 44, thereby moving or camming the ring axially in the direction of the gasket 36 and compressing same so as to move the valve seat 34 radially inwardly. If further compression is necessary, the appropriate chock (or chocks) is rotated until the flat a distance $a$ from the opposite surface of the hub 80 is again brought into contact with the wall 44, and the chock is moved to the next succeeding notch 80b or 80c as the case may be and rotation begun again until the resulting compression produces the necessary radial expansion of the gasket.

In a preferred embodiment, movement of a chock from one notch 80 to an adjacent notch maintains a difference in axial displacement of the ring 62 of 0.04 inch if the same flat of the chock is in engagement with the groove wall 44. In addition, rotation of the chock illustrated in FIG. 4 will produce a total axial displacement of approximately 0.034 inch in four increments.

While a specific embodiment of the invention has been shown and described, a number of variations thereof are possible. For example, the notches 80 can be provided in a second ring disposed adjacent the groove wall 44, the chocks being thereby interposed between two rings. Likewise, while the location of the notches 80 conveniently locate the chocks to assure that pressure will be applied uniformly to the gasket, such notches could in some instances be dispensed with or could be other than a curved configuration to coact with a hub having other than a cylindrical surface. Also, additional sets of notches could be provided. In some circumstances, the chocks could be of uniform cross-sectional configuration from one end to the other so as not to include a hub, with the spacing between opposed sets of faces being varied to provide the desired variation incident to rotation. If a sufficient number of notches were provided, the added adjustment achieved by rotation of the chocks may not be required. Finally, and with reference to FIG. 2, the head 88 of the chock 64 could be of circular rather than polygonal configuration and serve merely as a retainer, with the head 86 bearing the load.

The ring 62 thus provided is of single piece construction and, in conjunction with the chocks 64, applies a uniform axially directed force to the gasket 36 to effect its compression. Depending upon its dimensions relative to the flange 56 of the gasket 36, it may exert a radially directed force on the flange to securely hold the ring and gasket in place. However, even when such radially directed forces are not exerted, the ring resists any tendency for the lip 68 to be lifted off the inner surface of the flange 56 as might occur with very short segments combining to form the ring. This is due to the fact that the chocks 64 prevent axial movement of the entire ring as a unit away from the gasket. The single piece construction of the ring also prevents tipping or rocking of any given portion effective to lift the lip 68 since such tipping or rocking would necessarily be accompanied by an axial movement of a remote portion of the ring, which axial movement is prevented by the chocks 64.

Figure 8:
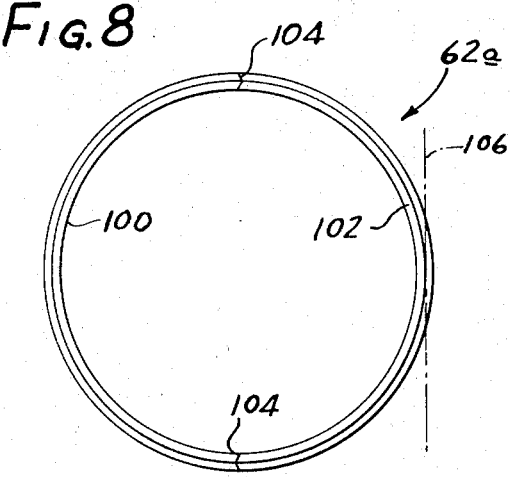
FIGS. 8 and 9 are elevational views showing alternate forms of the element illustrated in FIG. 6.
Figure 9:
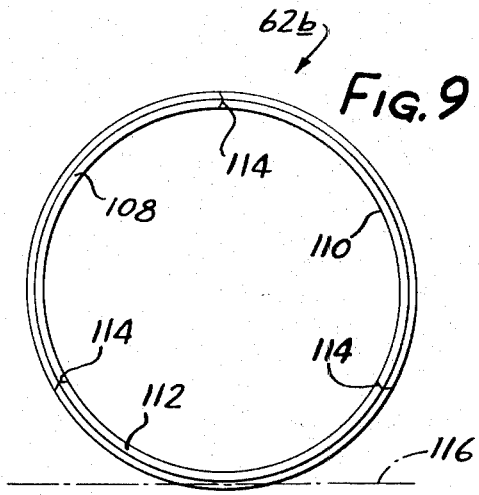

There is illustrated in FIGS. 8 and 9 alternate embodiments 62a and 62b, respectively, of the ring 62 which, it is believed, would perform satisfactorily under certain circumstances. The ring 62a of FIG. 8 is identical in cross-sectional configuration to the ring 62 but, rather than being in the form of a single piece, is formed of two semi-annular segments or portions 100 and 102 which abut at V-shaped cuts 104. The additional cut facilitates displacement of portions of the ring to permit its insertion into the groove of the valve body. It is contemplated that the ring 62a be dimensioned so that its lip 68 will place the flange 56 of the gasket 36 in radial compression and the ring in compression as well.

It will be appreciated that the arcuate length of the segments 100 and 102 is such that any tendency for one of the segments, such as the segment 102, to rock, as about an axis indicated by the line 106, would tend to cause the ends of the segment at the cuts 104 to move axially and that this movement would be resisted by frictional forces at the cuts 104 as well as by the chocks bearing against the face of the segment adjacent such cuts. The interlocking of the segments at the V-shaped cuts insures that the circular configuration of the ring will be maintained.

In the embodiment of FIG. 9, the ring 62b is comprised of three arcuate segments 108, 110 and 112, each of which is approximately 120° in length circumferentially. The ends of the segments abut at V-shaped cuts 114. It is contemplated that the ring 62b be identical in cross-sectional configuration to the ring 62 and that it is dimensioned so that its lip 68 will place the flange 56 of the gasket 36 in radial compression and the ring in compression as well. The additional cuts facilitate displacement of portions of the ring to permit its insertion into the groove of the valve body.

As with the segment 102, the arcuate length of the segments 108, 110 or 112 is such that any tendency for one of the segments to rock as, for example, any tendency for the segment 112 to rock about the axis 116, would tend to cause the ends of the segment at the cuts 114 to move axially; and this movement will be resisted by frictional forces at the cuts as well as by the chocks bearing against the face of the segment adjacent the cuts. Again, the interlocking of the segments at the V-shaped cuts insures that the circular configuration will be maintained.

It is believed preferable that each of the segments defining the ring 62 has a sufficient arcuate length that tipping or rocking of the segment sufficient to lift the lip 68 of the ring off the flange 56 of the gasket would be possible only in conjunction with a significant amount of axial movement of the ends of the ring, which axial movement would be precluded by the chocks 64. The length of the arc required to achieve this condition will depend to some extent upon the degree of lift that can be tolerated, but arc lengths of 120° are believed acceptable. It should be understood, of course, that all of the segments need not be the same length. For example, one segment may have an arc length of 120° and a second segment have an arc length of 240°. Also, it is the effective arc length which is significant. Thus, two or more segments interconnected at their ends so as to function as a single piece might prove satisfactory even though each segment by itself might be of insufficient length if not so interconnected. Such interconnection is achieved in the principal embodiment by forming the entire ring 62 as a single piece, but it might also be achieved by interlocking shorter segments at their ends by means of suitably contoured mating end surfaces which would prevent relative axial movement of adjacent ends. Thus, one end of each segment might be provided with a projection or pin to be received in a slot or opening in the end of an adjacent segment.

Various features of the invention are set forth in the following claims.

What is claimed is:

1. A butterfly valve body comprising
   a valve body defining a fluid flow passageway and having an annular groove therein defined by a base encircling the flow axis of said passageway and first and second opposed groove walls extending from said base in the direction of the flow axis of said passageway,
   an annular gasket defining a valve disc seat disposed in said annular groove and projecting radially into said fluid flow passageway, which gasket has first and second opposite surfaces with said first surface lying in engagement with said first groove wall,
   said gasket being formed of a resilient material capable of expanding radially when subjected to forces having components extending in a direction parallel to the flow axis of said passageway,
   said gasket being proportioned so as to provide an annular space intermediate a portion of said gasket and said second groove wall and including an annular flange located within said space resting on said groove base,
   an annular retaining ring disposed within said annular space having one surface in engagement with said second gasket surface and the radially inward surface of said annular flange,
   said retaining ring having a normal outer diameter greater than the diameter of said fluid flow passageway adjacent said groove and said retaining ring being split to provide a discontinuity at a single point which permits the displacement of the end portions of said ring relative to each other at said split so as to enable said ring to be collapsed for insertion into said annular space and subsequently returned to a planar orientation in contact with said gasket second surface, and
   means for urging said ring axially into pressure engagement with said gasket to effect radial expansion thereof.

2. A butterfly valve body in accordance with claim 1, wherein said one groove wall is provided with a ledge overhanging the base of said groove, wherein said gasket is provided with an oppositely directed annular flange which lies in contact with said ledge of said groove wall.

3. A butterfly valve body in accordance with claim 1 wherein said annular retaining ring is dimensioned so that the surface thereof which lies in engagement with the radially inward surface of said annular flange has a diameter larger than said flange surface and places said flange in radially outward compression.

4. A butterfly valve body in accordance with claim 3 wherein said annular retaining ring has its outermost diameter less than the diameter of said groove base so as to provide an annular gap between said retaining ring and said groove base about the circumference thereof.

5. A butterfly valve body in accordance with claim 1 wherein the end portions of said ring at the location of said split are interlocked with each other to prevent relative radial movement therebetween.

6. A butterfly valve body in accordance with claim 5 wherein said annular retaining ring at the location of said split has one end portion formed with a generally V-shaped notch and the other end portion formed with a mating V-shaped projection.

7. A butterfly valve body in accordance with claim 1 wherein the cross section of said retaining ring is such to provide a gap between the surface thereof opposite from said one surface and said second groove wall, and wherein said urging means includes a plurality of chocks disposed in said gap.

8. A butterfly valve body in accordance with claim 7 wherein each of said chocks includes a polygonal head at each end of a generally cylindrical central portion, said heads being wider than the diameter of said central portion and having flat faces lying in common planes parallel to the cylindrical axis of said central portion, the geometric center of each head being displaced from the axis of said cylindrical portion, said cylindrical surface of said central portion and a pair of the flat faces engaging said opposite surface of said retaining ring and said second groove wall, one of said retaining ring and said second groove wall including projecting means which protrudes into the space between said heads to restrain said chocks against radial movement.

9. A butterfly valve body in accordance with claim 8 wherein the axes of rotation of each of said plurality of chocks lies in a plane substantially perpendicular to the flow axis of said valve body.

10. A butterfly valve body comprising
a valve body defining a fluid flow passageway and having an annular groove therein defined by a base encircling the flow axis of said passageway and first and second opposed groove walls extending from said base in the direction of the flow axis of said passageway,
an annular gasket defining a valve disc seat disposed in said annular groove and projecting radially into said fluid flow passageway, which gasket has first and second opposite surfaces with said first surface lying in engagement with said first groove wall,
said gasket being formed of a resilient material capable of expanding radially when subjected to forces having compoennts extending in a direction parallel to the flow axis of said passageway,
said gasket being proportioned so as to provide an annular space intermediate a portion of said gasket and said second groove wall and including an annular flange located within said space resting on said groove base,
an annular retaining ring disposed within said annular space having one surface in engagement with said second gasket surface and the radially inward surface of said annular flange,
said retaining ring being split into no more than three arcuate portions, adjacent ends of said split ring portions being interlocked with each other to prevent relative radial movement thereof, and
means for uring said retaining ring axially into pressure engagement with said gasket to effect radial expansion thereof.

11. A butterfly valve body in accordance with claim 10, wherein said one groove wall is provided with a ledge overhanging the base of said groove, wherein said gasket is provided with an oppositely directed annular flange which lies in contact with said ledge of said groove wall.

12. A butterfly valve body in accordance with claim 10 wherein said annular retaining ring is formed from a pair of arcuate ring sections each of which has an arcuate length of about 180°.

13. A butterfly valve body in accordance with claim 10 wherein said annular retaining ring is split at at least two circumferentially spaced points to divide said ring into separate portions, each of which portions has an arcuate length of at least about 120°.

14. A butterfly valve body in accordance with claim 10 wherein said interlocking end portions of said annular retaining ring are formed respectively with a generally V-shaped notch and with a mating V-shaped projection.

15. A butterfly valve body in accordance with claim 10 wherein said annular retaining ring is dimensioned so that the surface thereof which lies in engagement with the radially inward surface of said annular flange has a diameter larger than said flange surface and places said flange in radially outward compression.

16. A butterfly valve body in accordance with claim 15 wherein said annular retaining ring has its outermost diameter less than the diameter of said groove base so as to provide an annular gap between said retaining ring and said groove base about the circumference thereof.

17. A butterfly valve body in accordance with claim 10 wherein the cross section of said retaining ring is such to provide a gap between the surface thereof opposite from said one surface and said second groove wall, and wherein said urging means includes a plurality of chocks disposed in said gap.

18. A butterfly valve body in accordance with claim 17 wherein each of said chocks includes a polygonal head at each end of a generally cylindrical central portion, said heads being wider than the diameter of said central portion and having flat faces lying in common planes parallel to the cylindrical axis of said central portion, the geometric center of each head being displaced from the axis of said cylindrical central portion, said cylindrical surface of said central portion and a pair of the flat faces engaging said opposite surface of said annular retaining ring and said second groove wall, one of said annular retaining ring and said second groove wall including projecting means which protrudes into the space between said heads to restrain said chocks against radial movement.

19. A butterfly valve body comprising a valve body defining a fluid flow passageway and having an annular groove therein defined by a base encircling the flow axis of said passageway and first and second opposed groove walls extending from said base in the direction of the flow axis of said passageway, an annular gasket defining a valve disc seat disposed in said annular groove and projecting radially into said fluid flow passageway, said gasket having first and second opposite surfaces with said first surface lying in engagement with said first groove wall, said gasket being formed of a resilient material capable of expanding radially when subjected to a compressive load, said gasket being proportioned so as to provide an annular space intermediate a portion of said gasket and said second groove wall and including an annular flange located within said space resting on said groove base, and an annular retaining ring disposed within said annular space having one surface in engagement with said second gasket surface and the radially inward surface of said gasket annular flange, said retaining ring being integral except for a split at a single location which permits said retaining ring to be collapsed for installation into said valve body, said split ends of said ring being interlocked with each other to prevent relative radial movement thereof.

20. A butterfly valve body in accordance with claim 19 wherein the outer diameter of said retaining ring is greater than the inner diameter of said gasket annular flange so that said retaining ring is in pressure engagement with said gasket and applies a compressive load thereto which effects radial expansion thereof.

* * * * *

UNITED STATES PATENT OFFICE
CERTIFICATE OF CORRECTION

Patent No. 3,774,880    Dated November 27, 1973

Inventor(s) Carter C. Crookham et al.

It is certified that error appears in the above-identified patent and that said Letters Patent are hereby corrected as shown below:

Column 1, line 16, "interchanging" should be
                   --interengaging--.

Column 2, line 41, "vale" should be --valve--.

Column 5, line 48, "twellve" should be --twelve--.

Column 11, line 37, Claim 10, "compoennts" should be
                    --components--.

Column 11, line 52, Claim 10, "uring" should be
                    --urging--.

Signed and sealed this 11th day of June 1974.

(SEAL)
Attest:

EDWARD M. FLETCHER, JR.
Attesting Officer

C. MARSHALL DANN
Commissioner of Patents